United States Patent [19]

Harikrishnan et al.

[11] Patent Number: 5,768,566
[45] Date of Patent: Jun. 16, 1998

[54] METHOD AND FACILITY FOR UNINSTALLING A COMPUTER PROGRAM PACKAGE

[75] Inventors: Seetharaman Harikrishnan; Jeffrey T. Parsons, both of Redmond; Felix Andrew, Seattle; Christopher J. Guzak, Kirkland, all of Wash.

[73] Assignee: Microsoft Corporation, Redmond, Wash.

[21] Appl. No.: 609,283

[22] Filed: Mar. 1, 1996

[51] Int. Cl.$^6$ .................................................... G06F 9/455
[52] U.S. Cl. .................................... 395/500; 364/281.9
[58] Field of Search .................................. 395/500, 479, 395/404, 620, 200.1; 364/280.3, 281.9

[56] References Cited

U.S. PATENT DOCUMENTS

| | | | |
|---|---|---|---|
| 5,075,845 | 12/1991 | Lai et al. | 395/479 |
| 5,193,184 | 3/1993 | Belsan et al. | 395/404 |
| 5,403,639 | 4/1995 | Belsan et al. | 395/620 |
| 5,602,993 | 2/1997 | Stromberg | 395/200.1 |

OTHER PUBLICATIONS

No Standout In Uninstall Field, Jim Rapoza (1995).
Vertisoft Intros Remove–It!, Nick Anis (1994).

*Primary Examiner*—Kevin J. Teska
*Assistant Examiner*—Dan Fiul
*Attorney, Agent, or Firm*—Christensen, O'Connor, Johnson & Kindness

[57] ABSTRACT

A computer program product has a facility for uninstalling itself The facility is both efficient and dynamic. The facility only backs up a minimal set of files that may be affected by an installation of the computer program product. The facility dynamically adapts to different possible installations so as to only store backup copies for the particular installation that is to be used. The facility leverages a number of installation files to determine what files to back up.

30 Claims, 6 Drawing Sheets

1

METHOD AND FACILITY FOR UNINSTALLING A COMPUTER PROGRAM PACKAGE

TECHNICAL FIELD

The present invention relates generally to data processing systems, and more particularly, to uninstalling a computer program package in computer systems.

BACKGROUND OF THE INVENTION

When a computer program package is uninstalled, the computer system on which the computer program has been installed is modified to attempt to return the computer system to a state where the files that were present on the system before the computer program package was installed are again present on the system in their original form. Many conventional computer program packages include a limited ability to uninstall themselves. A first approach to uninstalling computer program packages that has been adopted by conventional systems has been to maintain a hard-coded list of directories that are manipulated by the installation program of the computer program package. All of the directories on the list are backed up (i.e., stored on secondary storage) so that if the user wishes to later uninstall the computer program package, the directories that have been backed up may be rewritten on the computer system. A substantial drawback of this approach is that the backed up directories occupy a substantial amount of secondary storage space.

Another alternative approach to uninstalling a computer program package that has been adopted by conventional systems has been to delete all files associated with the computer program package. Unfortunately, this can have deleterious effects because certain unintended files may be deleted. For example, if the computer system on which the computer program package is installed has a first version of a computer program package stored on secondary storage and the computer system is installing a second version of the same computer program package, this uninstalling approach may result in the deletion of both versions of the computer program package. Moreover, this approach may delete files that are shared and used by other computer programs.

SUMMARY OF THE INVENTION

The limitations of the conventional systems are overcome by the present invention. A first aspect of the present invention is directed to a method that is practiced on a computer system that has a storage area in which a set of files is stored. Per this method, a computer program package is provided that has multiple files for installation on the computer system. The computer program package has a number of different possible installations wherein which of the multiple files of the computer program package are installed depends on which installation is performed. It is determined that a selected one of the installations is to be performed and a subset of the set of files that may be affected by the selected installation is identified. Backup copies of the subset of files are stored in the storage area so that these files may later be used to uninstall the computer program package. This method may rely upon a comprehensive list of files that list all the files that may be manipulated by each of the possible installations.

In accordance with another aspect of the present invention, a computer program package that has different possible installations is provided. Where it is determined that a first of the possible installations is to be performed, a first subset of the set of files that are stored in a storage area of the computer system are identified and backup copies of this first subset of files are stored in the storage area. On the other hand, where it is determined that a second of the possible installations is to be performed, a second subset of the set of files that may be affected when the second of the possible installations is performed is identified and backup copies of the second subset of files are stored in the storage area.

In accordance with an additional aspect of the present invention, a function is used to generate a list of each file that may be affected for each possible installation of a computer program package that has multiple files that may be installed. Backup copies of files are stored based on the generated list and the same function is used to perform a selected one of the possible installations.

In accordance with a further aspect of the present invention, a computer-readable storage media holds a first file that is logically divided into sections. These sections include a section that lists files that have been added to a computer system as a result of installation of a computer program package. These files are for use when uninstalling the computer program package. The first file also includes a section listing files that have been deleted from the computer system as a result of installation of the computer program package and a section listing files that have been renamed as a result of installation of the computer program package. These lists of files are used when uninstalling the computer program package. The storage media may also hold compressed versions of the files that are listed as having been deleted or having been replaced during installation of the computer program package.

BRIEF DESCRIPTION OF THE DRAWINGS

The present invention will be described in more detail below with reference to a preferred embodiment which is depicted in the following figures.

DETAILED DESCRIPTION OF THE INVENTION

The preferred embodiment of the present invention provides a facility and approach for uninstalling a computer program package that is both efficient and dynamic. The preferred embodiment of the present invention is efficient in that it only backs up a minimal set of files that may have been affected by installation of the computer program package. The preferred embodiment is dynamic in that it does not automatically back up a fixed set of files; rather it dynamically identifies the files that need to be backed up based upon the installation options chosen by the user and the current computer configuration. In addition, the preferred embodiment provides an uninstalling approach that accounts for additional optional components and hardware that have been added to the computer system after the initial installation.

The preferred embodiment of the present invention provides a comprehensive list of files that may be affected by installation of the computer program package. For purposes of the discussion below, it is assumed that the computer program package being installed is an operating system. The comprehensive list may be provided on the storage medium in which the computer program package is sold or may be dynamically determined at the time of installation of the computer program package. This list of files that may be potentially affected is examined at the time of installation of the computer program package and compared with the list of files stored on a target computer system at which the computer program package is to be installed. The files that are on the list and resident at the target computer system are backed up in a compressed data format that minimizes the amount of storage space the files occupy. A list of the files that have been added, renamed, replaced and deleted during installation is also stored in conjunction with the backed up files. When a user or other entity requests that the computer program package be wholly uninstalled, the preferred embodiment uses the record of what files have been affected by the installation and the backup files to uninstall the computer program package.

Figure 1:
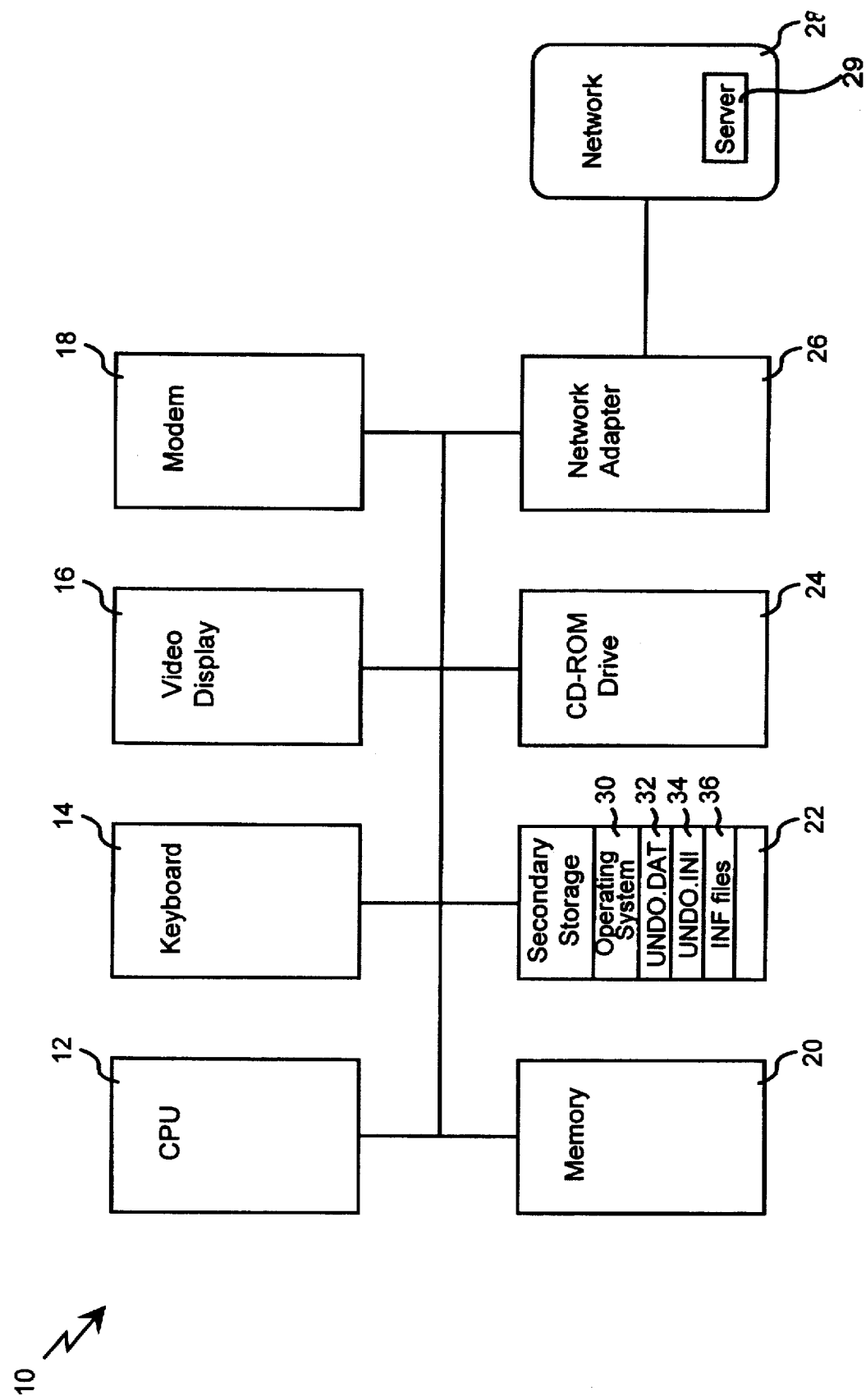
FIG. 1 is a block diagram that illustrates a computer system that is suitable for practicing the preferred embodiment of the present invention.

FIG. 1 is a block diagram of computer system 10 that is suitable for practicing the preferred embodiment of the present invention. The computer system 10 includes a central processing unit (CPU) 12 and a number of peripheral devices, including a keyboard 14 and a video display 16. The computer system 10 may also include a modem 18 for enabling the computer system to communicate with other remote computer systems. The computer system 10 also contains a memory 20 and a secondary storage 22, as well as additional secondary storage devices, such as CD-ROM drive 24. The computer system 10 includes a network adapter 26 for connecting the computer system with a network 28 that includes a server 29.

Although the preferred embodiment of the present invention will be described below relative to a single computer system, those skilled in the art will appreciate that the present invention may also be practiced in distributed environments wherein a computer program package is being installed at a client computer system 10 and the computer program package and setup program are resident at the server 29 in a remote network 28.

The secondary storage 22 holds a copy of an operating system 30. For purposes of illustration, it is assumed that the operating system 30 in the discussion below is the Microsoft® Windows® 95 operating system, sold by Microsoft Corporation of Redmond, Wash. The operating system 30 includes code for installing itself as well as a number of initialization and other files. These files include the UNDO.DAT file 32, the UNDO.INI file 34, and the INF files 36.

In order to understand how the preferred embodiment of the present invention operates, it is helpful to review the format of the INF files 36. An INF file is an installation text file that is logically divided into sections. Each of the sections of an INF file includes a generic means to specify copy, delete or rename operations (i.e. keys that specify whether files are to be copied, renamed or deleted). Set forth below is an example of an INF file.

```
[version]
LayoutFile=layout.inf
signature="$CHICAGO$"
[GenInst]
CopyFiles = boot.files, sys.files
RenFiles = ren.old.files
DelFiles = del.old.root
[GenInst2]
CopyFiles = ios.files, VxD.Files
[boot.files]
command.new, command.com,,1
sulogo.sys,,,1
winboot.new, winboot.sys,,1
[ren.old.files]
mode___dos.com, mode.com
[sys.files]
advapi32.dll,,,8
comdlg32.dll,,,8
comm.drv
commctrl.dll, kommctrl.dll, kommctrl.dll
crtdll.dll,,,8
[del.old.root]
WINA20.386
|ios.files|
apix.vxd
cdfs.vxd
cdtsd.vxd
hsflop.pdr
[VxD.Files]
biosxlat.vxd,,,1
configmg.vxd,,,1
vpicd.vxd,,,1
v86mmgr.vxd,,,1
[DestinationDirs]
; Destination directories for sections listed in the CopyFiles=,
    Delfiles= and
; RenFiles= directives.
; and associated pre-defined Logical Disk Identifiers (LDID).
;
; <file-list section>=<pre-defined LDID>[,<subdir>]
;
ren.old.files    = 34    ; LDID_OLD_DOS (user's old DOS dir.)
boot.files       = 30    ; LDID_BOOT (root of boot drive)
sys.files        = 11    ; LDID_SYS (WINDOWS\SYSTEM dir.)
del.old.root     = 30    ; LDID_BOOT (root of boot drive)
VxD.Files        = 22    ; LDTD_VMM32 (VMM32
                                directory off of WINDOWS\SYSTEM)
ios.files        = 12    ; LDID_IOS (IOSUBSYS directory
                                off of WINDOWS\SYSTEM)
```

In the above example, the sections are delineated by bracketed headers. For instance, the first section of the above INF file is the "[version]" section. Sections may be unconditional generic installation sections that are always utilized during installation and conditional sections that are only utilized if certain conditions are detected. The "[GenInst]" and "[GenInst2]" sections are examples of unconditional generic installation sections. Underneath the headings for the sections are a list of files to be copied, renamed or deleted. The "CopyFiles" directive specifies the files that are to be copied. These copies are itemized after the equals sign. Similarly, the "RenFiles" directive specifies the files that are to be renamed follow and the "DelFiles" directive specifies the files to be deleted. In the above example, "CopyFiles= boot.files, sys.files" at the first line of the "[GenInst]" section specifies that the files itemized in the "[boot.files]" section and "[sys.files]" section are to be copied. The "[boot.files]" section contains a list of boot files that are to be copied on installation and the "[sys.file]" section contains a list of system files that are to be copied on installation.

The next line of the "[GenInst]" section contains the statement "RenFiles =ren.old.files," which specifies that the files to be renamed are found in the "[ren.old.files]" section. The "[ren.old.files]" section contains both the old filename and the renamed filename. Lastly, the statement "DelFiles =del.old.root," at the third line of this section, specifies that files to be deleted upon installation are listed in the "[del.old.root]" section.

The "[DestinationDirs]" section of the INF file holds destination directories for sections that are listed after the CopyFiles, DelFiles and RenFiles directives. These directories are identified by logical disk identifiers (LDID). For example, the statement "ren.old.files=34" in this section indicates that the directory for the old file is at LDID 34.

The installation of the operating system 30 is, in large part, a matter of processing each of the INF files that are provided. A setup engine is provided in the operating system to look at these INF files and determines which files to copy, which files to delete, which files to rename and which files to replace. The use of the INF files in the installation of the operating system 30 is leveraged in the preferred embodiment of the present invention to assist uninstalling of the operating system, as will be described in more detail below.

Figure 2:
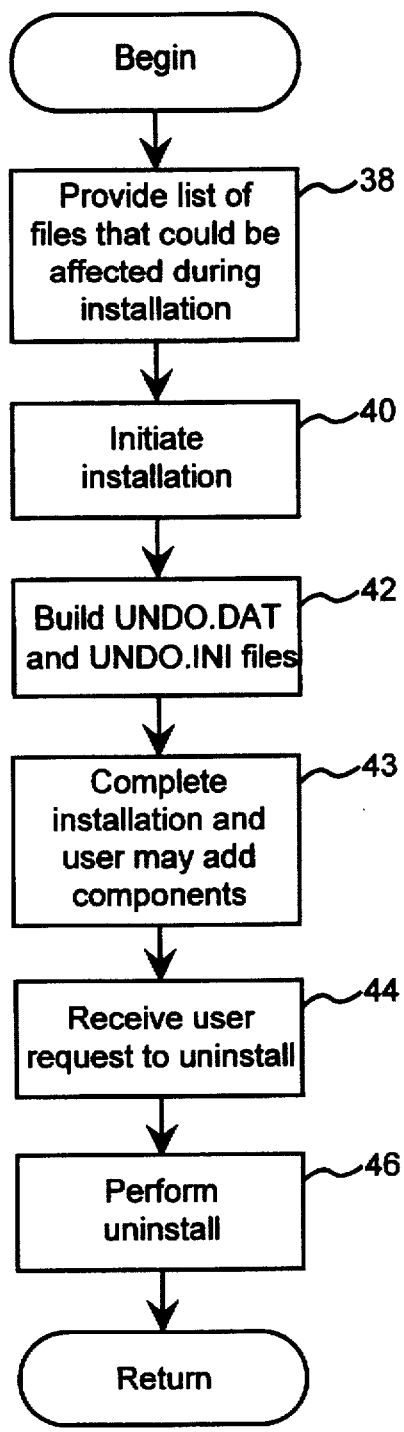
FIG. 2 is a flowchart illustrating the steps that are performed to uninstall a computer program in accordance with the preferred embodiment of the present invention.
Figure 3:
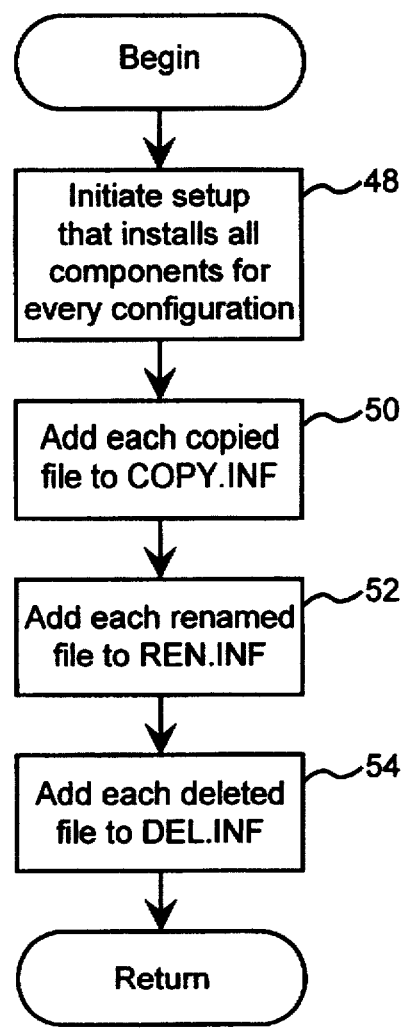
FIG. 3 is a flowchart illustrating the steps that are performed to generate a list of files that may be potentially affected by installation in the preferred embodiment of the present invention.

FIG. 2 is a flowchart that provides an overview of how the operating system 30 is uninstalled in the preferred embodiment of the present invention. Initially, a list of all files that could be affected during installation is provided (step 38 in FIG. 2). This list may be shipped with the computer program package or may be generated during the installation of the computer program package. FIG. 3 is a flowchart illustrating the steps that are performed to generate such a list of files. A setup program is initiated that acts as if it seeks to install all possible installations to generate the list of files. In other words, a universal setup program is run to generate the list of files (step 48 in FIG. 3). The installation, however, does not actually take place, as will be described in more detail below. The computer system 10 then generates three INF files. The first such file is the COPY.INF file which holds information regarding each file that is copied during installation with the universal setup program running. The second such INF file, REN.INF, holds information for each file that is renamed during the execution of the universal setup program, and the third such INF file, DEL.INF file, holds information for each of the files that is deleted during execution of the universal setup program. While the universal setup program is executing, information is added to these three INF files. Specifically, each copied file is added to COPY.INF (step 50 in FIG. 3). Similarly, each file that is renamed is added to REN.INF (step 52 in FIG. 3), and each file that is deleted is added to DEL.INF (step 54 in FIG. 3). The net result is that universal lists of all files that may be copied, renamed or deleted during any possible installation are generated. The INF files specify the filename and destination LDID for the associated copied, renamed or deleted files. Although the preferred embodiment of the present invention implements three INF files, those skilled in the art will appreciate that the present invention may also be practiced with a system that generates a single INF file that is divided into three sections: one for copied files, one for renamed files and one for deleted files.

In performing the above-described mock setup for generating the three INF files, the computer system 10 uses the GenInstallEx( ) application program interface (API) that is provided as part of the setup engine for the operating system 30. The GenInstallEx( ) API is passed a handle to the INF file which it is to process to realize installation. The API is also passed the name of the section that has appropriate directives for performing the installation is also passed to this API. The identity of a call-back procedure is also passed to the GenInstallEx( ) API. The call-back procedure is called by the GenInstallEx( ) API before any copy, delete, or rename operation is performed. The call-back procedure is used to create the three INF files by logging information with which it is called into the INF files. The call-back procedure tells the GenInstallEx( ) API to skip the operation and proceed to the next operation. As a result, the copy, delete, and rename operations are not performed, but a dry run of a full setup installation is performed so that the list of all files that can potentially be affected by installation is generated. Subsequently, the GenInstallEx( ) API is utilized during the actual installation. When the GenInstallEx( ) API is used during installation, the call-back procedure does not log information and does not tell the API to skip operations.

After the list of files that could be affected during initialization is provided (see step 38 in FIG. 2), installation of the operating system 30 is initiated (step 40 in FIG. 2). The user may be presented with user interface or other mechanism for specifying options regarding the installation. Once all these options are specified, the appropriate information must be backed up. Alternatively, the system may assume that the user seeks to install all possible installations without waiting for the options to be selected. The files are backed up assuming any files on the system that are on the list of files that may be affected will be affected by the installation. In the preferred embodiment of the present invention, this backed up information takes the form of two files: UNDO.DAT and UNDO.INI. The UNDO.DAT file holds each of the files that is to be backed up in compressed file format, whereas the UNDO.INI file holds information regarding the files that are backed up. Thus, the process of backing up the appropriate information involves building the UNDO.DAT and UNDO.INI files (step 42 in FIG. 2).

Before describing how the UNDO.DAT and UNDO.INI files are built, it is helpful first to review the file format of the UNDO.INI file. The UNDO.INI file is logically partitioned into sections and includes an "[Added]" section that contains information for files that were added by the operating system. The UNDO.INI file also includes a "[Deleted]" section that contains information for files that were deleted and a "[Replaced]" section that contains information for files that were replaced (i.e., one version of the file was replaced with another version of the file) during installation. The UNDO.INI file also contains a "[Renamed]" section that contains information for renamed files. In addition, the UNDO.INI file contains a "[Paths]" section that contains the actual pathnames for various destination LDIDs where files are modified.

The lines of text contained under the "[Added]" section identify a file specification that is a combination of a directory ID with a filename/path for the added file. For example, "11,rundll32.exe" is an example of a file specification that provides a directory ID of 11 and a filename of "rundll32.exe." The lines of text that appear in the "[Deleted]" section and the "[Replaced]" section specify a file specification, an original size of the file, the date on which the file was last modified, the time at which the file was last modified, the original attributes of the file, and the offset of original file contents in a DAT file.

The lines of text in the "[Renamed]" section specify a file specification for the new filename and a file specification for the old filename. Lastly, the lines of text in the "[Paths]" section specify a mapping of a directory ID to a fully qualified pathname for a destination directory.

Figure 4:
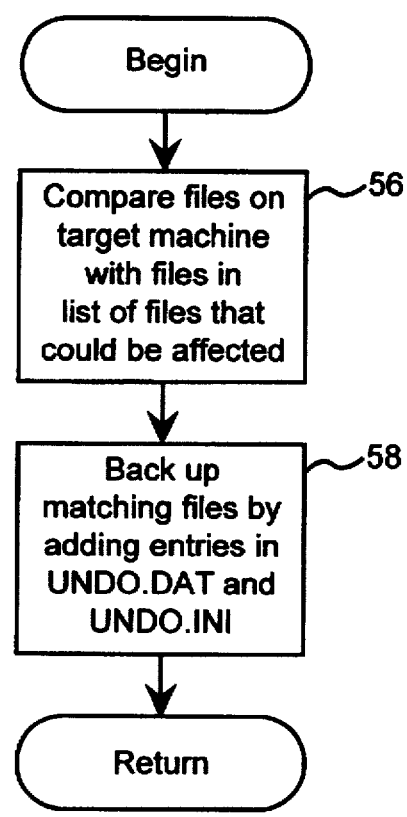
FIG. 4 is a flowchart illustrating the steps that are performed to determine what files should be backed up in the preferred embodiment of the present invention.

FIG. 4 is a flowchart illustrating the steps that are performed to build the UNDO.DAT and UNDO.INI files (see step 42 of FIG. 2). Initially, each of the files stored on the computer system are compared to the files in the list of files that could be affected during installation, which was provided in step 38 of FIG. 2 (step 56 in FIG. 4). The files that match those in the list are backed up by adding entries in the UNDO.DAT and UNDO.INI files (step 58 in FIG. 4). The computer system 10 is aware of the mapping of the LDIDs to actual paths and can provide this information for the generation of the UNDO.INI file. The backup files are stored in a compressed file format. After the UNDO.DAT and UNDO.INI files have been created, the installation may go forward until completed (see step 43 in FIG. 2).

Figure 5:
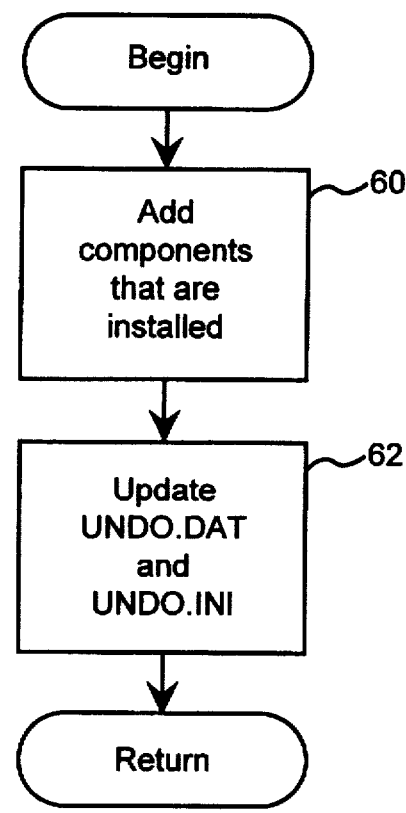
FIG. 5 is a flowchart illustrating the steps that are performed to account for changes in components that are installed after initial installation in accordance with the preferred embodiment of the present invention.

In many instances, however, the configuration of the operating system may change by a user adding hardware or adding components (see step 43 in FIG. 2). FIG. 5 is a flowchart illustrating the steps that are performed in such instances. Initially, components are added for the computer program package (step 60 in FIG. 5). For example, new drivers may be added when a new hardware component is added to the computer system 10. The UNDO.INI and UNDO.DAT files must be updated to reflect the files that have been added, deleted, replaced or renamed by the addition of the component (step 62 in FIG. 5). The operating system provides a facility for updating these files properly.

Figure 6:
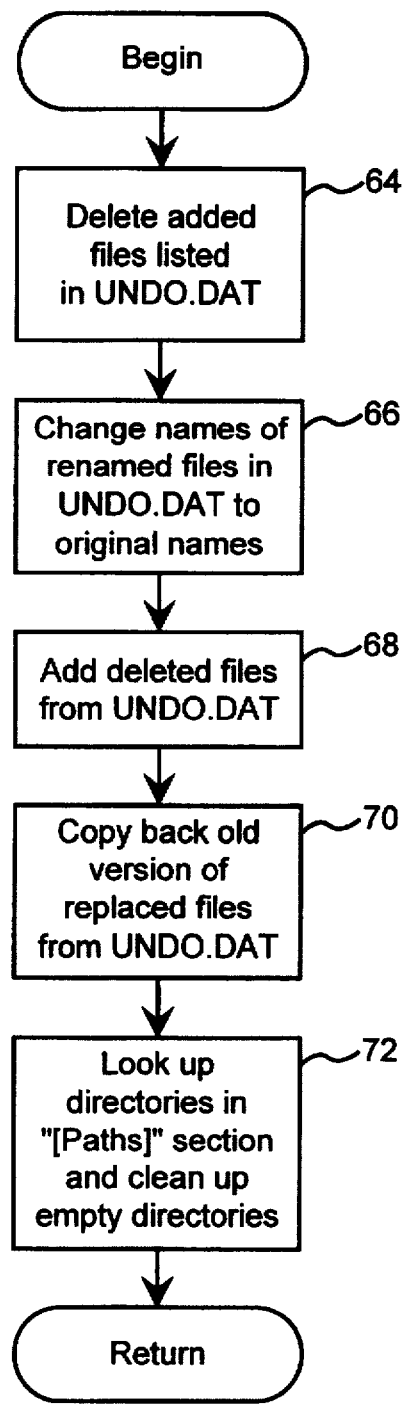
FIG. 6 is a flowchart illustrating the steps that are performed to uninstall a computer program in accordance with the preferred embodiment of the present invention.

The uninstall facility is invoked when a user or other program request is received to wholly uninstall the operating system (step 44 in FIG. 2). The uninstall facility then proceeds to uninstall all of the components of the operating system 30 so as to return the files in the computer system 10 to as they were before installation of the operating system. The uninstall facility goes through the UNDO.INI file 34 on a section-by-section basis to determine how to undo the installation of the operating system. FIG. 6 is a flowchart of the steps that are performed by the uninstall facility. First, files listed under the "[Added]" section are deleted (step 64 in FIG. 6). Then, the names of files listed under the "[Renamed]" section are changed back to their original names (step 66 in FIG. 6). Deleted files listed under the "[Deleted]" section of UNDO.DAT are added back to their appropriate destination directories unless a copy of the deleted file is already found in storage (step 68 in FIG. 6). Replaced files listed under the "[Replaced]" section are then copied back into the directories (step 70 in FIG. 6). Lastly, the "[Paths]" section is walked and the directories listed therein are examined. If the directories are empty, the directories are cleaned up and removed (step 72 in FIG. 6). As a result, the uninstallation is completed.

One of the strengths of the preferred embodiment of the present invention is that it only backs up a minimal set of files that could be affected by installation. As a result, it occupies substantially less storage space than conventional brute force approaches. Moreover, the backing up of files is dynamic such that it varies depending upon the installation options chosen by a user. This also can result in fewer files being backed up.

While the present invention has been described with reference to a preferred embodiment thereof, those skilled in the art will appreciate that various changes in form and detail may be made without departing from the intended scope of the present invention as defined in the appended claims.

We claim:

1. In a computer system having a storage area in which a set of files is stored, a method comprising the computer-implemented steps of:

providing a computer program package having multiple files for installation on the computer system, said computer program package having a number of different possible installations wherein which of the multiple files of the computer program package are installed depends on which installation is performed;

determining that a selected one of the installations is to be performed;

identifying a subset of the set of files that are affected by the selected installation that is to be performed without a user identifying the subset; and storing in the storage area backup copies of only the subset of files that are affected by the selected installation.

2. The method of claim 1, further comprising the step of performing the selected installation of the computer program package.

3. The method of claim 2, further comprising the step of uninstalling the computer program package using the backup copies of the subset of files.

4. The method of claim 3, further comprising the step of performing the uninstalling in response to a request by a user.

5. The method of claim 2, further comprising the steps of:

installing at least one additional one of the multiple files of the computer program package after the performing of the selected installation of the computer program package; and storing a backup copy of the additional one of the multiple files in the storage area.

6. The method of claim 1 wherein the step of storing backup copies comprises the step of storing backup copies in a compressed file format.

7. The method of claim 1 wherein the step of identifying a subset of the files that are affected by the selected installation that will be performed includes examining installation files for the computer program package.

8. The method of claim 1 wherein the computer system is a distributed system that includes a server and a client and wherein the computer program package is provided at the server system and the computer program package is to be installed at the client.

9. In a computer system having a storage device for storing files, a method comprising the computer-implemented steps of:

providing a computer program package for installation, said computer program package including multiple files and said computer program package having multiple possible installations, wherein which ones of the multiple files in the software program package are installed in each possible installation differs per installation;

providing a comprehensive list of files that are manipulated by each of the possible installations;

identifying selected ones of the files stored on the storage device which are on the comprehensive list of files; and storing backup copies of the selected files on the storage device.

10. The method of claim 9, further comprising the step of installing the computer program package.

11. The method of claim 10, further comprising the step of using the backup copies of the selected files to uninstall the computer program package.

12. The method of claim 11 wherein the uninstalling of the computer program package is performed in response to user request.

13. The method of claim 9 wherein the computer program package is an operating system.

14. The method of claim 9 wherein the step of providing a comprehensive list of files comprises the step of providing at least one installation file that holds the comprehensive list of files.

15. The method of claim 9 wherein the step of storing backup copies of the selected files comprises the step of storing backup copies of the selected files in a compressed data format.

16. The method of claim 9 wherein the computer system is a distributed system that includes a client and a server and wherein the server provides the computer program package for installation at the client.

17. In a computer system having a storage area in which are stored a set of files, a method comprising the computer implemented steps of:

providing a computer program package having multiple files for installation on the computer system, said computer program package having a number of different possible installations wherein which of the multiple files of the computer program package are installed depends on which installation is performed;

where it is determined that a first of the possible installations is to be performed, identifying a first subset of the set of files that are affected when the first of the possible installations is performed without a user identifying the first subset;

storing backup copies of the first subset of the set of files in the storage area;

where it is determined that a second of the possible installations is to be performed, identifying a second subset of the set of files that are affected when the second of the possible installations is performed without the user identifying the second subset; and storing backup copies of the second subset of files in the storage area.

18. In a computer system having a storage area for storing a set of files, a method comprising the steps of:

providing a computer program package having multiple files for installation on the computer system, said computer program package having a number of different possible installations wherein which of the multiple files of the computer program package are installed depends on which installation is performed;

using a function to generate a list of each file that is affected for each of the possible installations;

storing backup copies of files based on the generated list; and using the function to perform a selected one of the possible installations.

19. The method of claim 18 wherein the function is an application program interface (API).

20. A computer system comprising:

a storage area for storing a set of files;

a computer program package having multiple files for installation and having a number of different installations wherein which of the multiples files of computer program package are installed depends on which installation is performed; and a setup engine for installing a selected one of the installations of the computer program packages and for storing backup copies of only those files that are modified by the selected installation in the storage area.

21. The computer system of claim 20, further comprising an uninstall facility for uninstalling the installation of the computer program package using the backup copies of the files that are modified by the selected installation.

22. The computer system of claim 20 wherein the setup engine further includes a component for identifying which files are modified by the selected installation.

23. The computer system of claim 20 wherein the setup engine includes a compression engine for storing the backup copies in a compressed file format.

24. The computer system of claim 20, further comprising a supplementary installation component for installing additional files in the computer program package after the selected installation has already been completed.

25. The computer system of claim 20 wherein the computer system is a distributed system.

26. A computer readable storage medium holding:

a computer program package for installation in a computer system that has a storage area in which are stored a set of files, said computer program package having multiple files and having a number of different possible installations wherein which of the multiple files of the computer program package are installed depends on which installation is performed;

instructions for performing the steps of:

determining that a selected one of the installations will be performed;

identifying a subset of the set of files that are affected by the selected installation that will be performed without a user identifying the subset; and storing backup copies of only the subset of files that may be affected by the selected installation in the storage area.

27. A computer readable storage medium holding a first file, said first file being logically divided into sections, said sections including:

a section listing files that have been added to a computer system as a result of installation of a computer program package for use when uninstalling the computer program package;

a section listing files that have been deleted from the computer system as a result of installation of the computer program package for use when uninstalling the computer program package; and a section listing files that have been renamed in the computer system as a result of installation of the computer program package for use when uninstalling the computer program package.

28. The computer-readable storage medium of claim 27, further holding compressed versions of the files that are listed in the section listing files that have been deleted and files that are listed in the section listing files that have been renamed.

29. The computer-readable storage medium of claim 27 wherein the first file also includes a section listing files that have been replaced by other files as a result of installation of the computer program package for use when uninstalling the computer program package.

30. The computer-readable storage medium of claim 27 wherein the first file also includes a section listing logical pathnames for directories that are affected as a result of installation of the computer program package for use when uninstalling the computer program package.

* * * * *

UNITED STATES PATENT AND TRADEMARK OFFICE
CERTIFICATE OF CORRECTION

PATENT NO. : 5,768,566  Page 1 of 2
DATED : June 16, 1998
INVENTOR(S) : S. Harikrishnan et al.

It is certified that error appears in the above-indentified patent and that said Letters Patent is hereby corrected as shown below:

On the title page, item :

| COLUMN | LINE | |
|---|---|---|
| [75] Pg. 1, col. 1 | Inventors | "Seetharaman Harikrishnan; Jeffrey T. Parsons, both of Redmond" should read --Seetharaman Harikrishnan, Redmond; Jeffrey T. Parsons, Bellevue-- |
| [57] Pg. 1, col. 2 | Abstract 2 of text | after "itself" insert --.-- |
| 4 | 18 | "dos.com. mode.com" should appear in normal script |
| 4 | 36 | after "Delfiles= and" delete the return |
| 5 | 2 | after "=" insert a character space |
| 5 | 6 | after "=" insert a character space |
| 5 | 13 | prior to and after "=" insert a character space |
| 5 | 17 | "determines" should read --determine-- |
| 6 | 1-2 | delete "is also passed to this API" |
| 6 | 55 | after "exe." insert a paragraph return |
| 7 | 30 | before "as they were" delete "to" |

UNITED STATES PATENT AND TRADEMARK OFFICE
CERTIFICATE OF CORRECTION

PATENT NO. : 5,768,566
DATED : June 16, 1998
INVENTOR(S) : S. Harikrishnan et al.

It is certified that error appears in the above-indentified patent and that said Letters Patent is hereby corrected as shown below:

COLUMN     LINE

9              14              "are" should read --is--
(Claim 17, line 2)

Signed and Sealed this

Twenty-second Day of June, 1999

Attest:

Q. TODD DICKINSON

*Attesting Officer*     Acting Commissioner of Patents and Trademarks